United States Patent
Smee et al.

(10) Patent No.: US 9,204,437 B2
(45) Date of Patent: Dec. 1, 2015

(54) METHODS AND APPARATUS FOR CONDITIONAL OFFLOAD OF ONE OR MORE LOG-LIKELIHOOD RATIOS (LLRS) OR DECODED BITS

(71) Applicant: QUALCOMM Incorporated, San Diego, CA (US)

(72) Inventors: John Edward Smee, San Diego, CA (US); Jean-Marie Quoc Danh Tran, San Diego, CA (US); Michael Lee McCloud, San Diego, CA (US); Peter John Black, San Diego, CA (US); Alexei Yurievitch Gorokhov, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 17 days.

(21) Appl. No.: 14/186,953

(22) Filed: Feb. 21, 2014

(65) Prior Publication Data
US 2014/0241269 A1    Aug. 28, 2014

Related U.S. Application Data

(60) Provisional application No. 61/770,195, filed on Feb. 27, 2013.

(51) Int. Cl.
*H04B 7/216* (2006.01)
*H04W 72/04* (2009.01)
*H04L 1/18* (2006.01)

(52) U.S. Cl.
CPC ........... *H04W 72/042* (2013.01); *H04L 1/1835* (2013.01); *H04L 1/1819* (2013.01); *H04L 1/1845* (2013.01)

(58) Field of Classification Search
CPC . H04W 72/042; H04L 1/1819; H04L 1/1835; H04L 1/1845
See application file for complete search history.

(56) References Cited

U.S. PATENT DOCUMENTS 8,408,475 B2   4/2013  Shen et al.
8,443,248 B2   5/2013  Eckert
(Continued)

FOREIGN PATENT DOCUMENTS

WO   WO-2012174819 A1   12/2012

OTHER PUBLICATIONS

Lee S.J., et al., "Forward Error Correction Decoding for WiMAX and 3GPP LTE Modems," Asilomar, 2008, pp. 1143-1147.
(Continued)

*Primary Examiner* — Clemence Han
(74) *Attorney, Agent, or Firm* — Patterson & Sheridan, LLP

(57) ABSTRACT

Techniques and apparatus are provided for conditional offload of one or more LLRs or decoded bits. An exemplary electronic device (ED) method includes receiving a transmission of a physical downlink shared channel (PDSCH) having a transport block (TB) comprising at least one code block (CB), performing a cyclic redundancy check (CRC) of the at least one CB, in a memory external to a modem core of the ED, storing a subset of log-likelihood ratios (LLRs) associated with the at least one CB if the at least one CB failed the CRC or decoded bits associated with the at least one CB if the at least one CB passed the CRC, wherein the subset is based on an LLR range of the transmission relative to an LLR range of one or more previous transmissions, and using the stored subset of LLRs or decoded bits to process a re-transmission of the PDSCH.

30 Claims, 10 Drawing Sheets

(56) References Cited

U.S. PATENT DOCUMENTS

| | | | |
|---|---|---|---|
| 2003/0023929 A1* | 1/2003 | Kajita | 714/781 |
| 2003/0039324 A1* | 2/2003 | Kajita et al. | 375/341 |
| 2009/0106635 A1* | 4/2009 | Kim et al. | 714/799 |
| 2009/0199062 A1* | 8/2009 | Shen et al. | 714/748 |
| 2009/0249150 A1* | 10/2009 | Grovlen | 714/748 |
| 2009/0249155 A1* | 10/2009 | Mayrench et al. | 714/748 |
| 2011/0276747 A1* | 11/2011 | Fuchs et al. | 711/103 |
| 2012/0236910 A1* | 9/2012 | Mikami | 375/219 |
| 2013/0042073 A1* | 2/2013 | Tao | 711/133 |
| 2013/0107993 A1* | 5/2013 | Muller-Weinfurtner et al. | 375/341 |
| 2013/0151920 A1 | 6/2013 | Mayrench et al. | |
| 2013/0176981 A1* | 7/2013 | Earnshaw et al. | 370/329 |
| 2013/0262952 A1 | 10/2013 | Hahm et al. | |
| 2013/0308540 A1* | 11/2013 | Abe et al. | 370/328 |
| 2014/0053049 A1* | 2/2014 | Chen et al. | 714/807 |
| 2014/0250343 A1* | 9/2014 | Mueller-Weinfurtner et al. | 714/748 |
| 2014/0376358 A1* | 12/2014 | Eder et al. | 370/216 |

OTHER PUBLICATIONS

International Search Report and Written Opinion—PCT/US2014/017894—ISA/EPO—Aug. 4, 2014.

* cited by examiner

METHODS AND APPARATUS FOR CONDITIONAL OFFLOAD OF ONE OR MORE LOG-LIKELIHOOD RATIOS (LLRS) OR DECODED BITS

CLAIM OF PRIORITY UNDER 35 U.S.C. §119

This application claims benefit of U.S. Provisional Patent Application Ser. No. 61/770,195, filed Feb. 27, 2013, which is herein incorporated by reference in its entirety.

BACKGROUND

I. Field

Certain aspects of the disclosure generally relate to wireless communications and, more particularly, methods and apparatus for conditional offload of one or more LLRs or decoded bits (e.g., to techniques for long-term evolution (LTE) and LTE-Advanced conditional hybrid automatic repeat request (HARQ) offload).

II. Background

Wireless communication networks are widely deployed to provide various communication services such as voice, video, packet data, messaging, broadcast, etc. These wireless networks may be multiple-access networks capable of supporting multiple users by sharing the available network resources. Examples of such multiple-access networks include Code Division Multiple Access (CDMA) networks, Time Division Multiple Access (TDMA) networks, Frequency Division Multiple Access (FDMA) networks, Orthogonal FDMA (OFDMA) networks and Single-Carrier FDMA (SC-FDMA) networks.

A wireless communication network may include a number of base stations that can support communication for a number of user equipments (UEs). A UE may communicate with a base station via the downlink and uplink. The downlink (or forward link) refers to the communication link from the base station to the UE, and the uplink (or reverse link) refers to the communication link from the UE to the base station.

A base station may transmit data and control information on the downlink to a UE and/or may receive data and control information on the uplink from the UE. On the downlink, a transmission from the base station may observe interference due to transmissions from neighbor base stations. On the uplink, a transmission from the UE may cause interference to transmissions from other UEs communicating with the neighbor base stations. The interference may degrade performance on both the downlink and uplink.

SUMMARY

Certain aspects of the present disclosure provide methods, corresponding apparatus, and program products, for conditional offload (e.g., long-term evolution (LTE) or LTE-Advanced conditional hybrid automatic repeat request (HARQ) offload) of one or more log-likelihood ratios (LLRs) or decoded bits.

Certain aspects provide a method for wireless communications by an electronic device. The method generally includes receiving a transmission of a physical downlink shared channel (PDSCH) having a transport block (TB) comprising at least one code block (CB), performing a cyclic redundancy check (CRC) of the at least one CB, in a memory external to a modem core of the electronic device, storing a subset of log-likelihood ratios (LLRs) associated with the at least one CB if the at least one CB failed the CRC or decoded bits associated with the at least one CB if the at least one CB passed the CRC, wherein the subset is based on an LLR range of the transmission relative to an LLR range of one or more previous transmissions, and using the stored subset of LLRs or decoded bits to process a re-transmission of the PDSCH.

Certain aspects provide an apparatus for wireless communications by an electronic device. The apparatus generally includes means for receiving a transmission of a physical downlink shared channel (PDSCH) having a transport block (TB) comprising at least one code block (CB), means for performing a cyclic redundancy check (CRC) of the at least one CB, means for, in a memory external to a modem core of the electronic device, storing a subset of log-likelihood ratios (LLRs) associated with the at least one CB if the at least one CB failed the CRC or decoded bits associated with the at least one CB if the at least one CB passed the CRC, wherein the subset is based on an LLR range of the transmission relative to an LLR range of one or more previous transmissions, and means for using the stored subset of LLRs or decoded bits to process a re-transmission of the PDSCH.

Certain aspects provide an apparatus for wireless communications by an electronic device. The apparatus generally includes at least one processor configured to receive a transmission of a physical downlink shared channel (PDSCH) having a transport block (TB) comprising at least one code block (CB), perform a cyclic redundancy check (CRC) of the at least one CB, in a memory external to a modem core of the electronic device, store a subset of log-likelihood ratios (LLRs) associated with the at least one CB if the at least one CB failed the CRC or decoded bits associated with the at least one CB if the at least one CB passed the CRC, wherein the subset is based on an LLR range of the transmission relative to an LLR range of one or more previous transmissions, and use the stored subset of LLRs or decoded bits to process a re-transmission of the PDSCH. The apparatus generally also includes a memory coupled with the at least one processor.

Certain aspects provide a computer program product for wireless communications by an electronic device. The computer program product generally includes a computer-readable medium having instructions stored thereon, the instructions executable by an apparatus for receiving a transmission of a physical downlink shared channel (PDSCH) having a transport block (TB) comprising at least one code block (CB), performing a cyclic redundancy check (CRC) of the at least one CB, in a memory external to a modem core of the electronic device, storing a subset of log-likelihood ratios (LLRs) associated with the at least one CB if the at least one CB failed the CRC or decoded bits associated with the at least one CB if the at least one CB passed the CRC, wherein the subset is based on an LLR range of the transmission relative to an LLR range of one or more previous transmissions, and using the stored subset of LLRs or decoded bits to process a re-transmission of the PDSCH.

Various aspects and features of the disclosure are described in further detail below.

BRIEF DESCRIPTION OF THE DRAWINGS

So that the manner in which the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects.

DETAILED DESCRIPTION

Methods and apparatus are provided herein for conditional offload of one or more log-likelihood ratio (LLRs) or decoded bits. Techniques and apparatus are provided herein for long-term evolution (LTE) conditional hybrid automatic repeat request (HARQ) offload. A wireless device can receive a physical downlink shared channel (PDSCH) transmission. The device performs a cyclic redundancy check (CRC) on a transport block (TB) and/or code block (CB). Based on whether the TB and/or CB passes or fails the CRC, associated LLRs and/or decoded bits are offloaded to an external memory (e.g., a memory external to a core, such as a modem core, of the device). These LLRs and decoded bits are then available to be onloaded for use in decoding a subsequent re-transmission of the PDSCH.

The techniques described herein may be used for various wireless communication networks such as CDMA, TDMA, FDMA, OFDMA, SC-FDMA and other networks. The terms "network" and "system" are often used interchangeably. A CDMA network may implement a radio technology such as Universal Terrestrial Radio Access (UTRA), cdma2000, etc. UTRA includes Wideband CDMA (WCDMA) and other variants of CDMA. cdma2000 covers IS-2000, IS-95 and IS-856 standards. A TDMA network may implement a radio technology such as Global System for Mobile Communications (GSM). An OFDMA network may implement a radio technology such as Evolved UTRA (E-UTRA), Ultra Mobile Broadband (UMB), IEEE 802.11 (Wi-Fi), IEEE 802.16 (WiMAX), IEEE 802.20, Flash-OFDM®, etc. UTRA and E-UTRA are part of Universal Mobile Telecommunication System (UMTS). 3GPP Long Term Evolution (LTE) and LTE-Advanced (LTE-A) are new releases of UMTS that use E-UTRA. UTRA, E-UTRA, UMTS, LTE, LTE-A and GSM are described in documents from an organization named "3rd Generation Partnership Project" (3GPP). cdma2000 and UMB are described in documents from an organization named "3rd Generation Partnership Project 2" (3GPP2). The techniques described herein may be used for the wireless networks and radio technologies mentioned above as well as other wireless networks and radio technologies. For clarity, certain aspects of the techniques are described below for LTE, and LTE terminology is used in much of the description below.

Example Wireless Network

Figure 1:
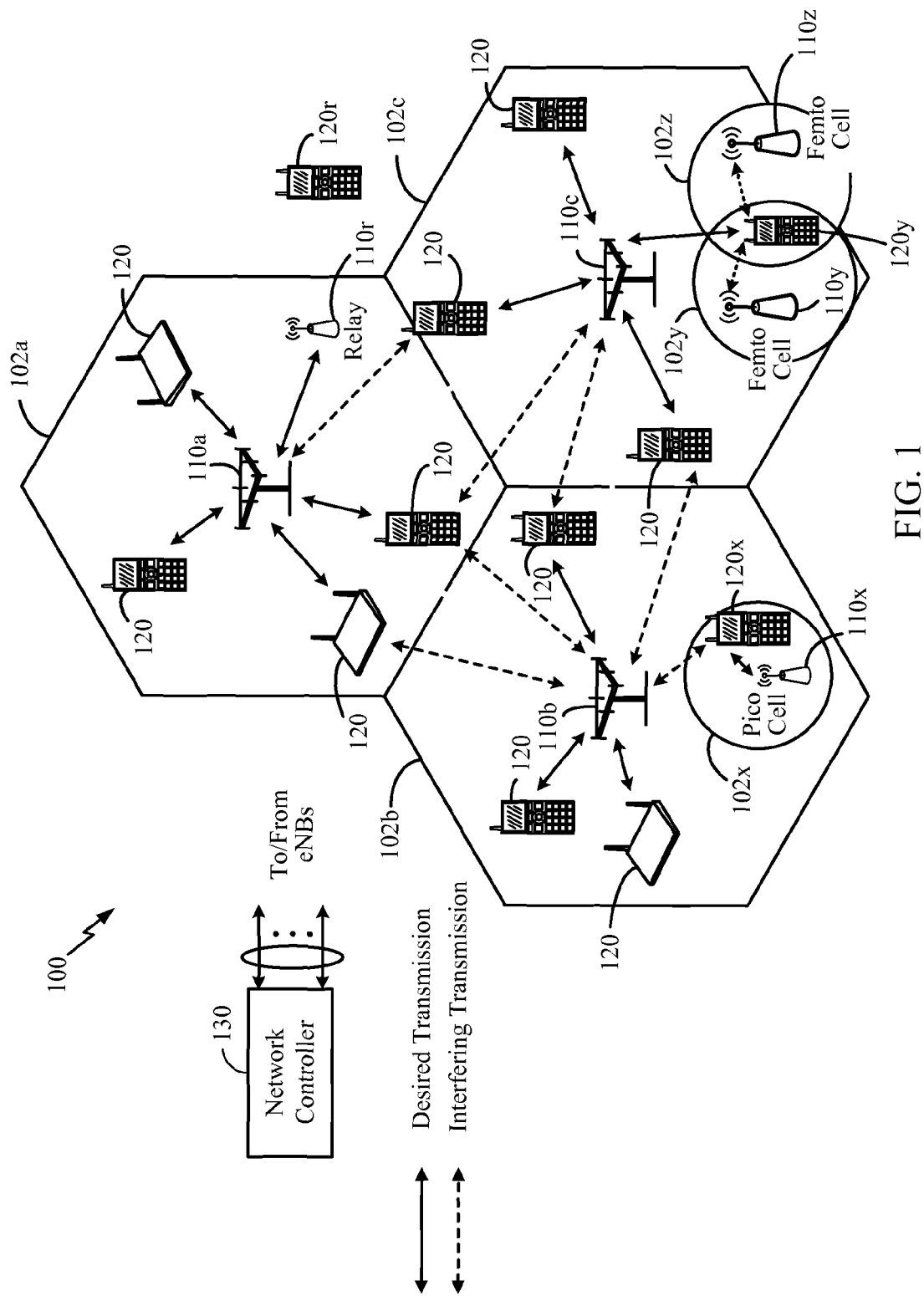
FIG. 1 is a block diagram conceptually illustrating an example of a wireless communications network, in accordance with certain aspects of the present disclosure.

FIG. 1 shows a wireless communication network 100, which may be an LTE network. The wireless network 100 may include a number of evolved Node Bs (eNBs) 110 and other network entities. An eNB may be a station that communicates with user equipment devices (UEs) and may also be referred to as a base station, a Node B, an access point, etc. Each eNB 110 may provide communication coverage for a particular geographic area. In 3GPP, the term "cell" can refer to a coverage area of an eNB and/or an eNB subsystem serving this coverage area, depending on the context in which the term is used.

An eNB may provide communication coverage for a macro cell, a pico cell, a femto cell, and/or other types of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a Closed Subscriber Group (CSG), UEs for users in the home, etc.). An eNB for a macro cell may be referred to as a macro eNB (e.g., a macro base station). An eNB for a pico cell may be referred to as a pico eNB (e.g., a pico base station). An eNB for a femto cell may be referred to as a femto eNB (e.g., a femto base station) or a home eNB. In the example shown in FIG. 1, eNBs 110a, 110b, and 110c may be macro eNBs for macro cells 102a, 102b, and 102c, respectively. eNB 110x may be a pico eNB for a pico cell 102x. eNBs 110y and 110z may be femto eNBs for femto cells 102y and 102z, respectively. An eNB may support one or multiple (e.g., three) cells.

The wireless network 100 may also include relay stations. A relay station is a station that receives a transmission of data and/or other information from an upstream station (e.g., an eNB or a UE) and sends a transmission of the data and/or other information to a downstream station (e.g., a UE or an eNB). A relay station may also be a UE that relays transmissions for other UEs. In the example shown in FIG. 1, a relay station 110r may communicate with eNB 110a and a UE 120r in order to facilitate communication between eNB 110a and UE 120r. A relay station may also be referred to as a relay eNB, a relay, etc.

The wireless network 100 may be a heterogeneous network (HetNet) that includes eNBs of different types, e.g., macro eNBs, pico eNBs, femto eNBs, relays, etc. These different types of eNBs may have different transmit power levels, different coverage areas, and different impact on interference in the wireless network 100. For example, macro eNBs may have a high transmit power level (e.g., 20 watts) whereas pico eNBs, femto eNBs, and relays may have a lower transmit power level (e.g., 1 watt).

The wireless network 100 may support synchronous or asynchronous operation. For synchronous operation, the eNBs may have similar frame timing, and transmissions from different eNBs may be approximately aligned in time. For asynchronous operation, the eNBs may have different frame timing, and transmissions from different eNBs may not be aligned in time. The techniques described herein may be used for both synchronous and asynchronous operation.

A network controller 130 may couple to a set of eNBs and provide coordination and control for these eNBs. The network controller 130 may communicate with eNBs 110 via a backhaul. The eNBs 110 may also communicate with one another, e.g., directly or indirectly via wireless or wireline backhaul.

The UEs 120 may be dispersed throughout the wireless network 100, and each UE may be stationary or mobile. A UE may also be referred to as a terminal, a mobile station, a subscriber unit, a station, etc. A UE may be a cellular phone, a personal digital assistant (PDA), a wireless modem, a wireless communication device, a handheld device, a laptop computer, a cordless phone, a wireless local loop (WLL) station, a tablet, etc. A UE may be able to communicate with macro eNBs, pico eNBs, femto eNBs, relays, etc. In FIG. 1, a solid line with double arrows indicates desired transmissions between a UE and a serving eNB, which is an eNB designated to serve the UE on the downlink and/or uplink. A dashed line with double arrows indicates interfering transmissions between a UE and an eNB. For certain aspects, the UE may comprise an LTE Release 10 UE.

LTE utilizes orthogonal frequency division multiplexing (OFDM) on the downlink and single-carrier frequency division multiplexing (SC-FDM) on the uplink. OFDM and SC-FDM partition the system bandwidth into multiple (K) orthogonal subcarriers, which are also commonly referred to as tones, bins, etc. Each subcarrier may be modulated with data. In general, modulation symbols are sent in the frequency domain with OFDM and in the time domain with SC-FDM. The spacing between adjacent subcarriers may be fixed, and the total number of subcarriers (K) may be dependent on the system bandwidth. For example, K may be equal to 128, 256, 512, 1024, or 2048 for system bandwidth of 1.25, 2.5, 5, 10, or 20 megahertz (MHz), respectively. The system bandwidth may also be partitioned into subbands. For example, a subband may cover 1.08 MHz, and there may be 1, 2, 4, 8, or 16 subbands for system bandwidth of 1.25, 2.5, 5, 10, or 20 MHz, respectively.

Figure 2:
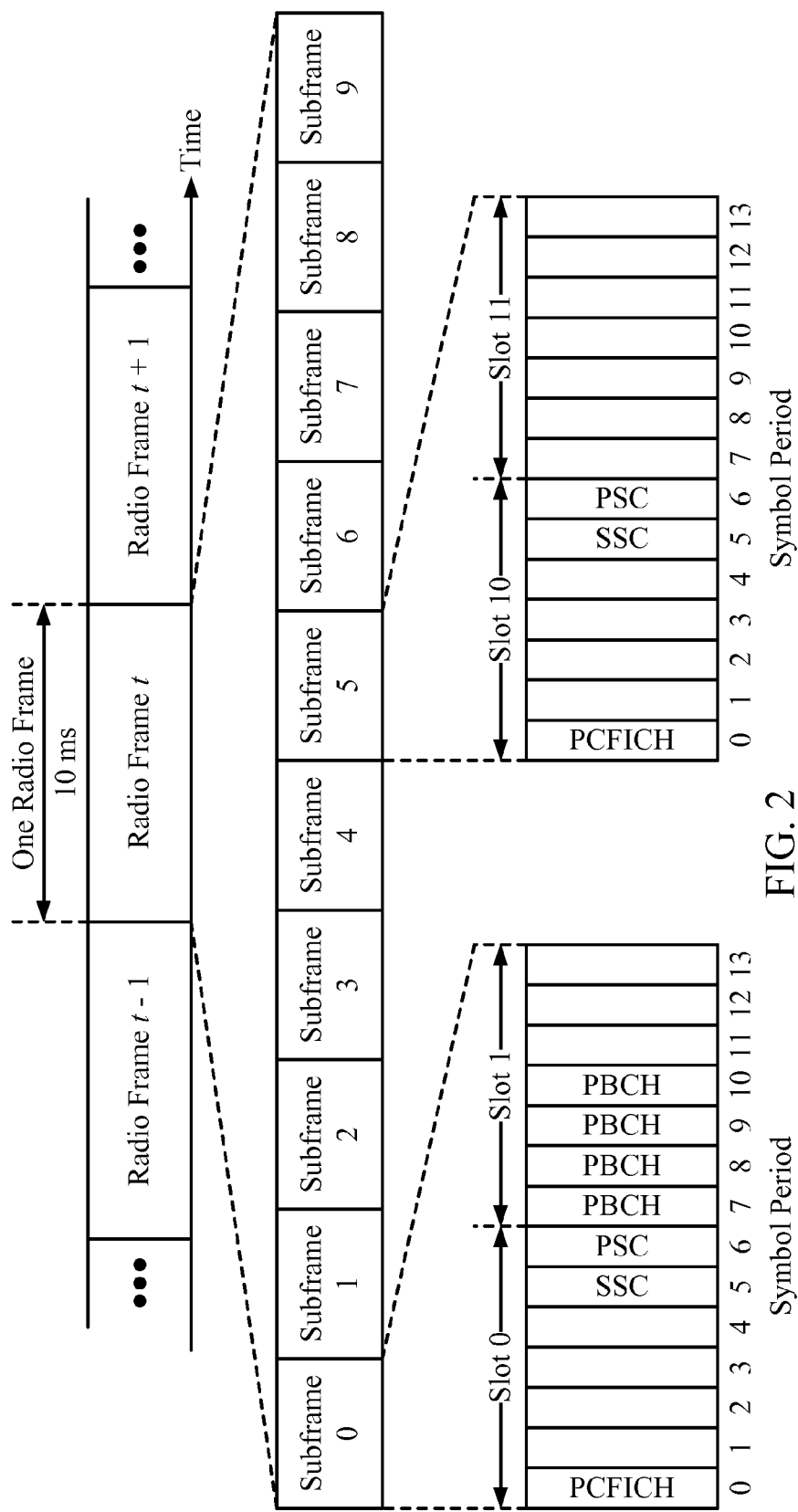
FIG. 2 is a block diagram conceptually illustrating an example of a frame structure in a wireless communications network, in accordance with certain aspects of the present disclosure.

FIG. 2 shows a frame structure used in LTE. The transmission timeline for the downlink may be partitioned into units of radio frames. Each radio frame may have a predetermined duration (e.g., 10 milliseconds (ms)) and may be partitioned into 10 subframes with indices of 0 through 9. Each subframe may include two slots. Each radio frame may thus include 20 slots with indices of 0 through 19. Each slot may include L symbol periods, e.g., L=7 symbol periods for a normal cyclic prefix (as shown in FIG. 2) or L=6 symbol periods for an extended cyclic prefix. The 2L symbol periods in each subframe may be assigned indices of 0 through 2L−1. The available time frequency resources may be partitioned into resource blocks. Each resource block may cover N subcarriers (e.g., 12 subcarriers) in one slot.

In LTE, an eNB may send a primary synchronization signal (PSS) and a secondary synchronization signal (SSS) for each cell in the eNB. The primary and secondary synchronization signals may be sent in symbol periods 6 and 5, respectively, in each of subframes 0 and 5 of each radio frame with the normal cyclic prefix, as shown in FIG. 2. The synchronization signals may be used by UEs for cell detection and acquisition. The eNB may send a Physical Broadcast Channel (PBCH) in symbol periods 0 to 3 in slot 1 of subframe 0. The PBCH may carry certain system information.

The eNB may send a Physical Control Format Indicator Channel (PCFICH) in the first symbol period of each subframe, as shown in FIG. 2. The PCFICH may convey the number of symbol periods (M) used for control channels, where M may be equal to 1, 2, or 3 and may change from subframe to subframe. M may also be equal to 4 for a small system bandwidth, e.g., with less than 10 resource blocks. The eNB may send a Physical HARQ Indicator Channel (PHICH) and a Physical Downlink Control Channel (PDCCH) in the first M symbol periods of each subframe (not shown in FIG. 2). The PHICH may carry information to support hybrid automatic repeat request (HARQ). The PDCCH may carry information on resource allocation for UEs and control information for downlink channels. The eNB may send a Physical Downlink Shared Channel (PDSCH) in the remaining symbol periods of each subframe. The PDSCH may carry data for UEs scheduled for data transmission on the downlink. The various signals and channels in LTE are described in 3GPP TS 36.211, entitled "Evolved Universal Terrestrial Radio Access (E-UTRA); Physical Channels and Modulation," which is publicly available.

The eNB may send the PSS, SSS, and PBCH in the center 1.08 MHz of the system bandwidth used by the eNB. The eNB may send the PCFICH and PHICH across the entire system bandwidth in each symbol period in which these channels are sent. The eNB may send the PDCCH to groups of UEs in certain portions of the system bandwidth. The eNB may send the PDSCH to specific UEs in specific portions of the system bandwidth. The eNB may send the PSS, SSS, PBCH, PCFICH, and PHICH in a broadcast manner to all UEs, may send the PDCCH in a unicast manner to specific UEs and may also send the PDSCH in a unicast manner to specific UEs.

A number of resource elements may be available in each symbol period. Each resource element may cover one subcarrier in one symbol period and may be used to send one modulation symbol, which may be a real or complex value. Resource elements not used for a reference signal in each symbol period may be arranged into resource element groups (REGs). Each REG may include four resource elements in one symbol period. The PCFICH may occupy four REGs, which may be spaced approximately equally across frequency, in symbol period 0. The PHICH may occupy three REGs, which may be spread across frequency, in one or more configurable symbol periods. For example, the three REGs for the PHICH may all belong in symbol period 0 or may be spread in symbol periods 0, 1, and 2. The PDCCH may occupy 9, 18, 36, or 72 REGs, for example, which may be selected from the available REGs, in the first M symbol periods. Only certain combinations of REGs may be allowed for the PDCCH.

A UE may know the specific REGs used for the PHICH and the PCFICH. The UE may search different combinations of REGs for the PDCCH. The number of combinations to search is typically less than the number of allowed combinations for the PDCCH. An eNB may send the PDCCH to the UE in any of the combinations that the UE will search.

Figure 2A:
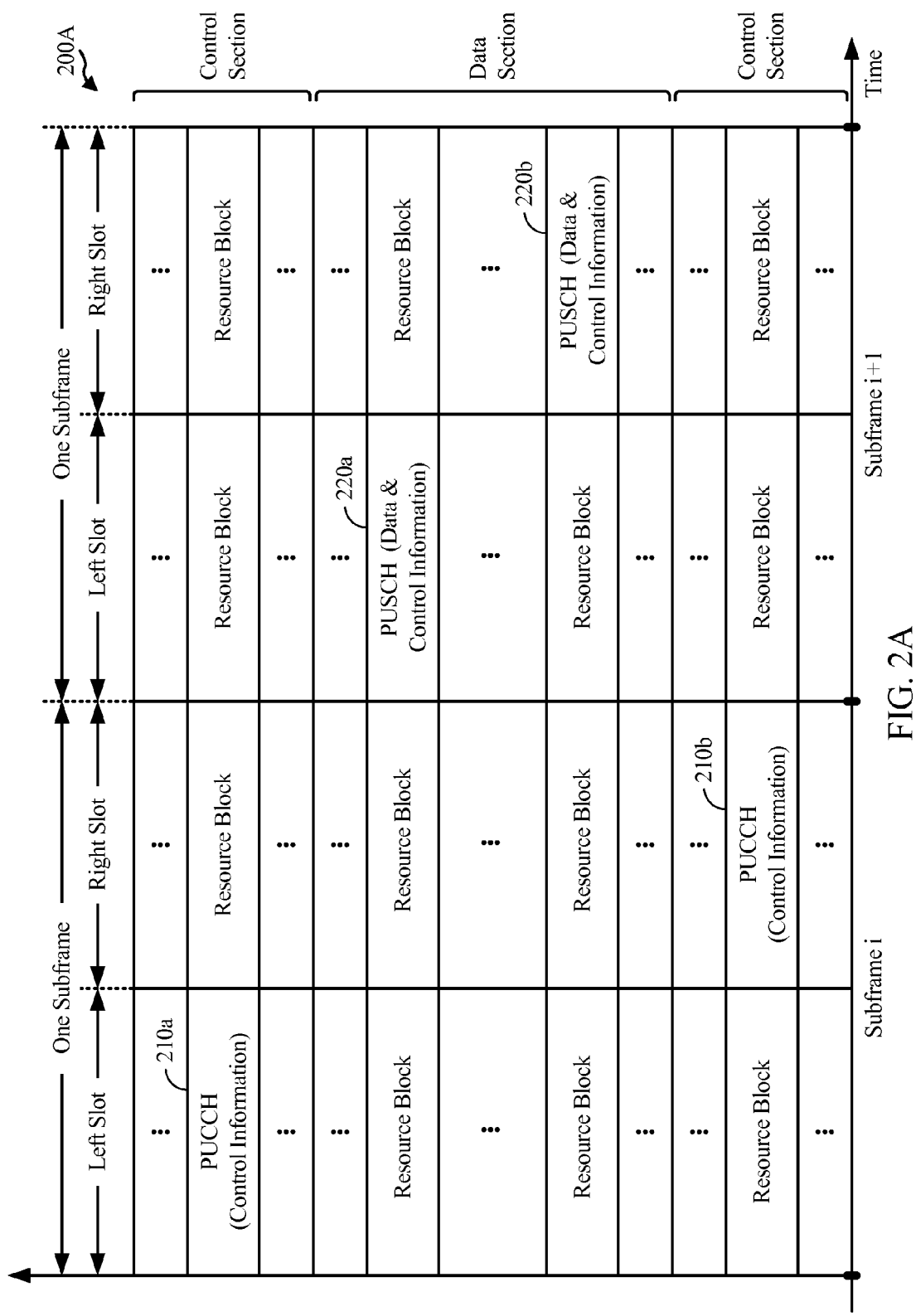
FIG. 2A shows an example format for the uplink in long term evolution (LTE), in accordance with certain aspects of the present disclosure.

FIG. 2A shows an exemplary format 200A for the uplink in LTE. The available resource blocks for the uplink may be partitioned into a data section and a control section. The control section may be formed at the two edges of the system bandwidth and may have a configurable size. The resource blocks in the control section may be assigned to UEs for transmission of control information. The data section may include all resource blocks not included in the control section. The design in FIG. 2A results in the data section including contiguous subcarriers, which may allow a single UE to be assigned all of the contiguous subcarriers in the data section.

A UE may be assigned resource blocks in the control section to transmit control information to an eNB. The UE may also be assigned resource blocks in the data section to transmit data to the eNB. The UE may transmit control information in a Physical Uplink Control Channel (PUCCH) 210a, 210b on the assigned resource blocks in the control section. The UE may transmit only data or both data and control information in a Physical Uplink Shared Channel (PUSCH) 220a, 220b on the assigned resource blocks in the data section. An uplink transmission may span both slots of a subframe and may hop across frequency as shown in FIG. 2A.

A UE may be within the coverage of multiple eNBs. One of these eNBs may be selected to serve the UE. The serving eNB may be selected based on various criteria such as received power, pathloss, signal-to-noise ratio (SNR), etc.

A UE may operate in a dominant interference scenario in which the UE may observe high interference from one or more interfering eNBs. A dominant interference scenario may occur due to restricted association. For example, in FIG. 1, UE 120y may be close to femto eNB 110y and may have high received power for eNB 110y. However, UE 120y may not be able to access femto eNB 110y due to restricted association and may then connect to macro eNB 110c with lower received power (as shown in FIG. 1) or to femto eNB 110z also with lower received power (not shown in FIG. 1). UE 120y may then observe high interference from femto eNB 110y on the downlink and may also cause high interference to eNB 110y on the uplink.

A dominant interference scenario may also occur due to range extension, which is a scenario in which a UE connects to an eNB with lower pathloss and lower SNR among all eNBs detected by the UE. For example, in FIG. 1, UE 120x may detect macro eNB 110b and pico eNB 110x and may have lower received power for eNB 110x than eNB 110b. Nevertheless, it may be desirable for UE 120x to connect to pico eNB 110x if the pathloss for eNB 110x is lower than the pathloss for macro eNB 110b. This may result in less interference to the wireless network for a given data rate for UE 120x.

In an aspect, communication in a dominant interference scenario may be supported by having different eNBs operate on different frequency bands. A frequency band is a range of frequencies that may be used for communication and may be given by (i) a center frequency and a bandwidth or (ii) a lower frequency and an upper frequency. A frequency band may also be referred to as a band, a frequency channel, etc. The frequency bands for different eNBs may be selected such that a UE can communicate with a weaker eNB in a dominant interference scenario while allowing a strong eNB to communicate with its UEs. An eNB may be classified as a "weak" eNB or a "strong" eNB based on the received power of signals from the eNB received at a UE (and not based on the transmit power level of the eNB).

Figure 3:
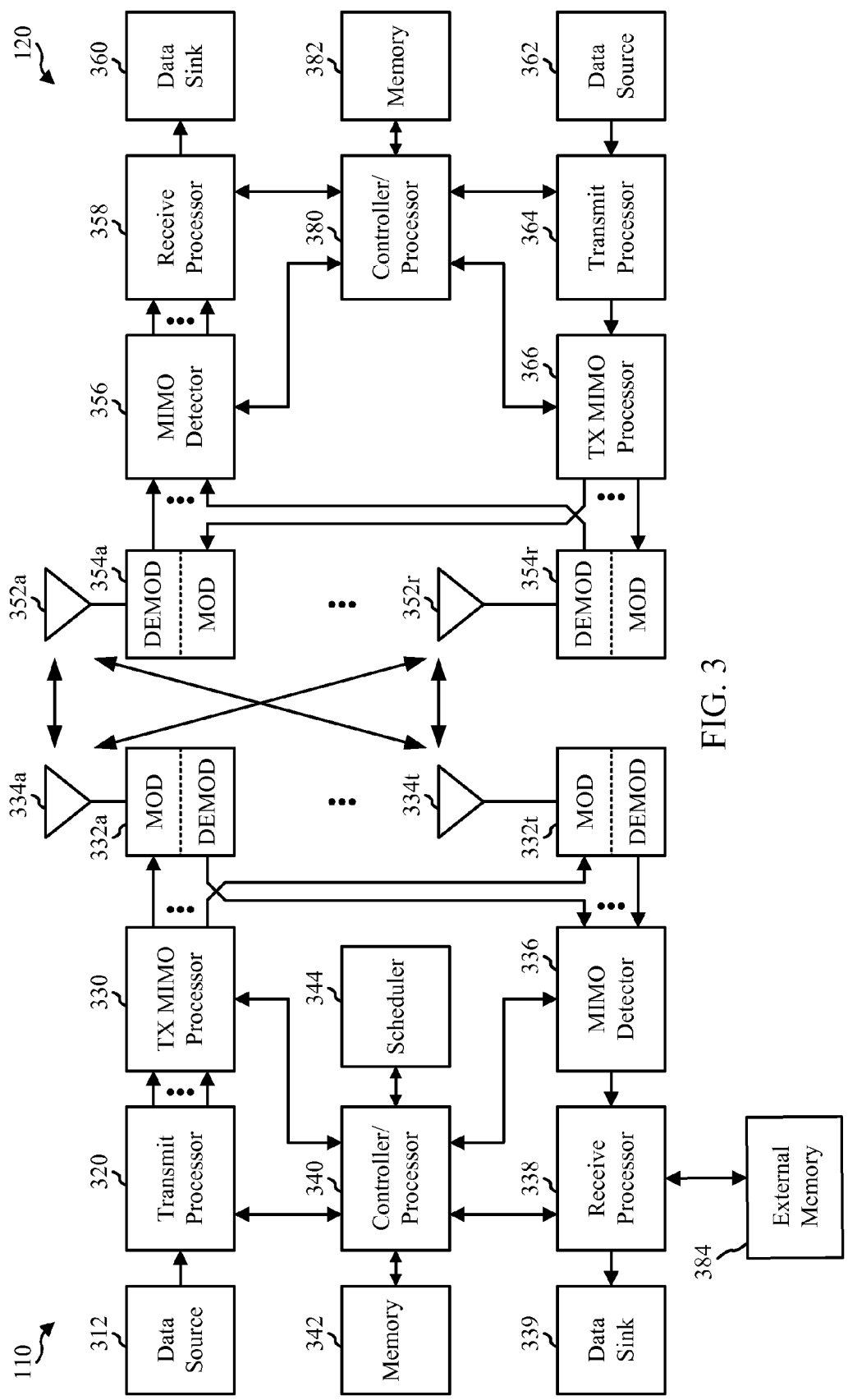
FIG. 3 shows a block diagram conceptually illustrating an example of a Node B in communication with a user equipment device (UE) in a wireless communications network, in accordance with certain aspects of the present disclosure.

FIG. 3 is a block diagram of a design of a base station or an eNB 110 and a UE 120, which may be one of the base stations/eNBs and one of the UEs in FIG. 1. For a restricted association scenario, the eNB 110 may be macro eNB 110c in FIG. 1, and the UE 120 may be UE 120y. The eNB 110 may also be a base station of some other type. The eNB 110 may be equipped with T antennas 334a through 334t, and the UE 120 may be equipped with R antennas 352a through 352r, where in general T≥1 and R≥1.

At the eNB 110, a transmit processor 320 may receive data from a data source 312 and control information from a controller/processor 340. The control information may be for the PBCH, PCFICH, PHICH, PDCCH, etc. The data may be for the PDSCH, etc. The transmit processor 320 may process (e.g., encode and symbol map) the data and control information to obtain data symbols and control symbols, respectively. The transmit processor 320 may also generate reference symbols, e.g., for the PSS, SSS, and cell-specific reference signal. A transmit (TX) multiple-input multiple-output (MIMO) processor 330 may perform spatial processing (e.g., precoding) on the data symbols, the control symbols, and/or the reference symbols, if applicable, and may provide T output symbol streams to T modulators (MODs) 332a through 332t. Each modulator 332 may process a respective output symbol stream (e.g., for OFDM, etc.) to obtain an output sample stream. Each modulator 332 may further process (e.g., convert to analog, amplify, filter, and upconvert) the output sample stream to obtain a downlink signal. T downlink signals from modulators 332a through 332t may be transmitted via T antennas 334a through 334t, respectively.

At the UE 120, antennas 352a through 352r may receive the downlink signals from the eNB 110 and may provide received signals to demodulators (DEMODs) 354a through 354r, respectively. Each demodulator 354 may condition (e.g., filter, amplify, downconvert, and digitize) a respective received signal to obtain input samples. Each demodulator 354 may further process the input samples (e.g., for OFDM, etc.) to obtain received symbols. A MIMO detector 356 may obtain received symbols from all R demodulators 354a through 354r, perform MIMO detection on the received symbols, if applicable, and provide detected symbols. A receive processor 358 may process (e.g., demodulate, deinterleave, and decode) the detected symbols, provide decoded data for the UE 120 to a data sink 360, and provide decoded control information to a controller/processor 380.

On the uplink, at the UE 120, a transmit processor 364 may receive and process data (e.g., for the PUSCH) from a data source 362 and control information (e.g., for the PUCCH) from the controller/processor 380. The transmit processor 364 may also generate reference symbols for a reference signal. The symbols from transmit processor 364 may be precoded by a TX MIMO processor 366 if applicable, further processed by modulators 354a through 354r (e.g., for SC-FDM, etc.), and transmitted to the eNB 110. At the eNB 110, the uplink signals from the UE 120 may be received by the antennas 334, processed by the demodulators 332, detected by a MIMO detector 336 if applicable, and further processed by a receive processor 338 to obtain decoded data and control information sent by the UE 120. The receive processor 338 may provide the decoded data to a data sink 339 and the decoded control information to the controller/processor 340.

The controllers/processors 340 and 380 may direct the operation at the eNB 110 and the UE 120, respectively. The controller/processor 380, receive processor 358, and/or other processors and modules at the UE 120 may perform or direct operations 900 in FIG. 9 and/or other processes for the techniques described herein. However, any other processor or component in FIG. 3 may be perform or direct operations 900 in FIG. 9 and/or other processes for the techniques described herein. The memories 342 and 382 may store data and program codes for the eNB 110 and the UE 120, respectively. Although the memories 342 and 382 are shown separate from the processors, in the various aspects, a memory may be internal to a processor (e.g., cache or register). A memory 384 may be external to a processor, and may store data or information for the UE 120. A scheduler 344 may schedule UEs for data transmission on the downlink and/or uplink.

Example LTE Conditional Offload of One or More LLRs or Decoded Bits

Minimization of on-chip memory usage and power is desirable for advanced user equipment (UE) modem implementations. To improve link-efficiency, many wireless systems employ hybrid automatic repeat request (HARQ). Employing a HARQ process, a transport block (TB) may decode successfully on the first transmission or, if not successfully decoded, be retransmitted such that the receiver can combine information from previous transmissions with the current retransmission prior to decoding. Certain modems, such as long-term evolution (LTE) modems, use higher data rates and HARQ and, thus, the UE stores log-likelihood ratios (LLRs) for higher numbers of code blocks (CBs) for HARQ combining on retransmissions of failing transport blocks (TBs).

For LTE downlink, on a retransmission of the physical downlink shared channel (PDSCH)—which uses turbo-coding—the UE receiver typically combines the calculated log-likelihood ratios LLRs from the current transmission with a stored sum from prior transmissions prior to re-attempting decoding. Consequently, the UE receiver typically stores LLRs from prior transmissions for each of the active HARQ interlaces. The total number of soft channel bits (e.g., LLRs) expected to be stored by the UE across all HARQ interlaces is represented by the value N_soft. If each of the LLRs is stored at a resolution with M bits precision, then the total UE storage across all HARQ interlaces can be approximated by M×N_soft—although memory addressing requirements typically are slightly higher than the approximated storage.

In LTE, TBs are broken into multiple code blocks CBs based on TB size. For example, as described in Section 36.212 of the LTE specification, each TB on the PDSCH channel may be broken into multiple CBs if the TB size is greater than a maximum CB size (e.g., greater than 6120 bits). In addition to a TB level cyclic redundancy check (CRC), each CB of the TB can also be transmitted with its own CRC.

CRC LTE DL physical layer parameter values, including the maximum TB size and N_soft, depend on the UE Category. For UE Category 1: the maximum number of downlink shared channel (DL-SCH) TB bits received within a transmission time interval (TTI) is 10296, the maximum number of bits of a DL-SCH TB received within a TTI is 10296, the total number of soft channel bits, N_soft, is 250368, and the maximum number of supported layers for spatial multiplexing in DL is 1. For category 2: the maximum number of DL-SCH TB bits receiving within a TTI is 51024, the maximum number of bits of a DL-SCH TB received within a TTI is 51024, N_soft is 1237248, and the maximum number of supported layers for spatial multiplexing in DL is 2. For category 3: the maximum number of DL-SCH TB bits receiving within a TTI is 102048, the maximum number of bits of a DL-SCH TB received within a TTI is 75376, N_soft is 1237248, and the maximum number of supported layers for spatial multiplexing in DL is 2. For category 4: the maximum number of DL-SCH TB bits receiving within a TTI is 150752, the maximum number of bits of a DL-SCH TB received within a TTI is 753756, N_soft is 1827072, and the maximum number of supported layers for spatial multiplexing in DL is 2. For category 5: the maximum number of DL-SCH TB bits receiving within a TTI is 299552, the maximum number of bits of a DL-SCH TB received within a TTI is 149776, N_soft is 3667200, and the maximum number of supported layers for spatial multiplexing in DL is 4. For LTE category 3 and category 4, the maximum TBS of 75376 corresponds to 13 CBs, and the LTE category 2 maximum TBS of 51024 corresponds to 9 CBs.

In one example, following the addition of a TB CRC of length L=24 to a TB of size A, the number of TB bits B is thus, B=A+L. The maximum CB size is Z=6144. If the number bits in TB, B, is equal or less than the maximum CB size, Z (i.e., B≤Z), then there is only one CB and no additional CB CRC is appended. However, if the number of TB bits, B, exceeds the maximum CB size, Z (i.e., if B>Z), then the TB is broken into more than one CB and a 24-bit CRC is added to each CB. The number of CBs, C, is given by the following formula:

$$C = \lceil B/(Z-L) \rceil.$$

Figure 4:
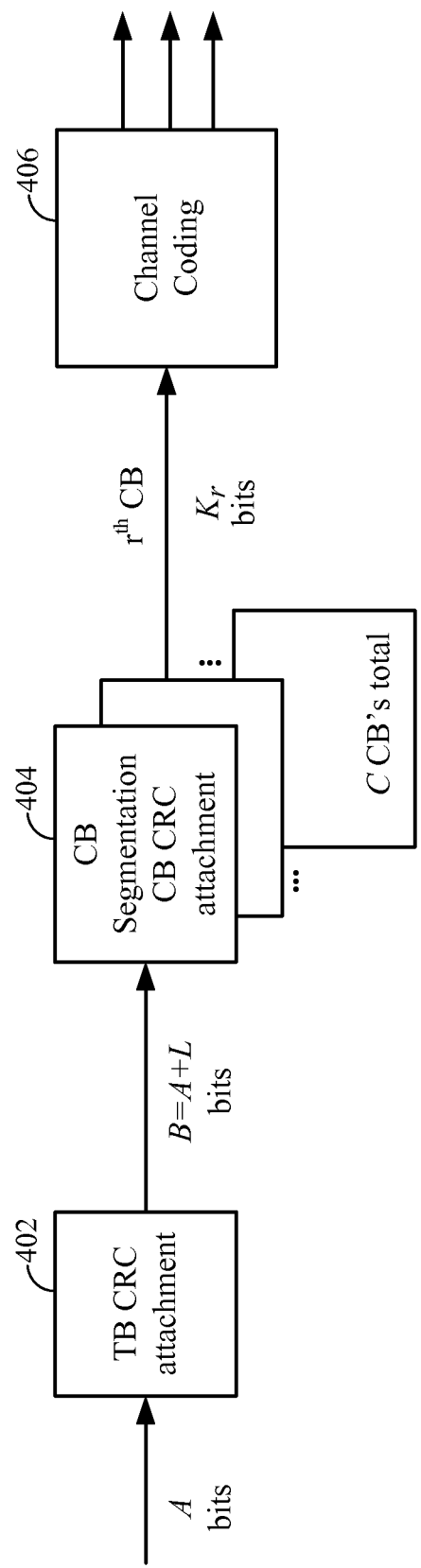
FIG. 4 illustrates example block diagram cyclic redundancy check (CRC) attachment and transport block (TB) segmentation into one or more code blocks (CBs), in accordance with certain aspects of the present disclosure.

FIG. 4 illustrates example block diagram of CRC attachment and TB segmentation into one or more CBs, in accordance with certain aspects of the present disclosure. As shown in FIG. 4, on the LTE PDSCH data channel (e.g., for a LTE Category 4 UE), the transmission of each TB corresponds to a transmission of A bits. At block 402, a TB CRC of size L bits is attached (i.e., B=A+L). At block 404, if the number of TB bits, B, is greater than the maximum CB size, the TB can be segmented into C CBs (e.g., between one and thirteen CBs depending on the TB size) and each CB has its own 24-bit CB CRC attached in addition to the TB having its 24-bit TB CRC. At block 406, each $r^{th}$ CB of $K_r$ bits are channel coded.

Figure 5:
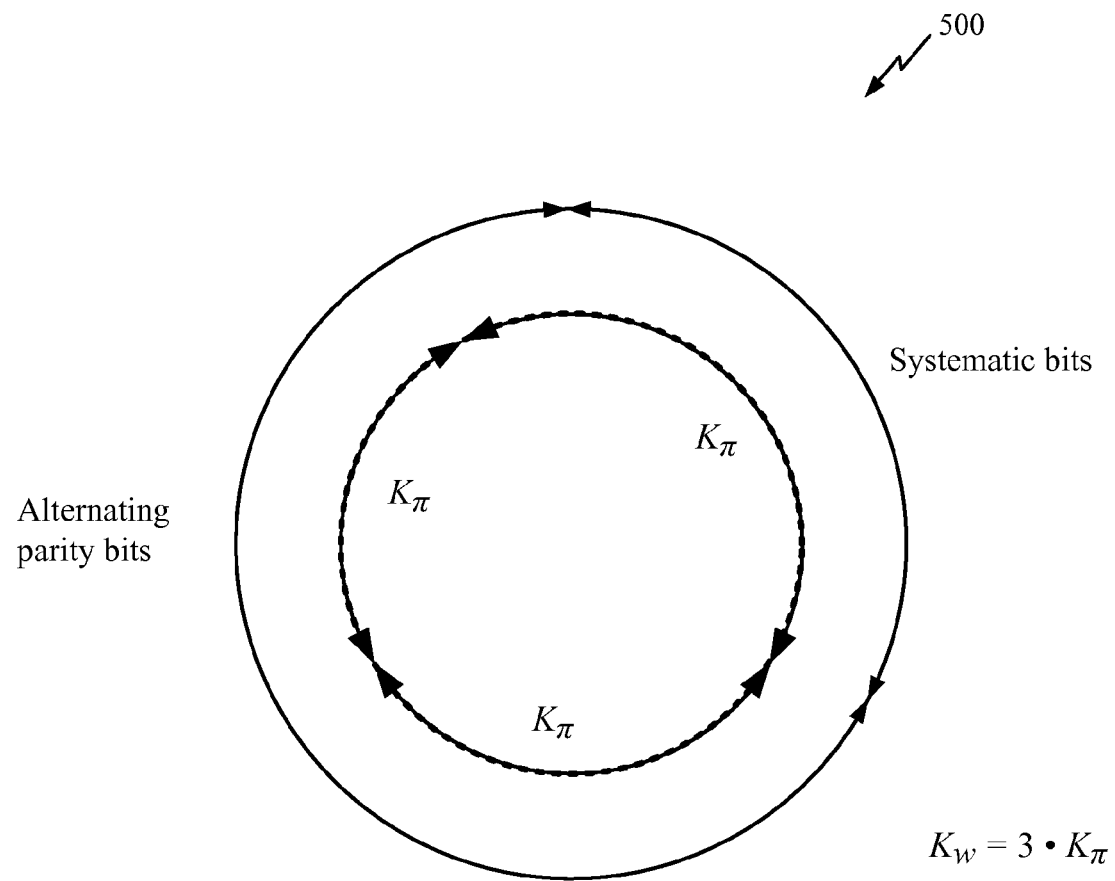
FIG. 5 illustrates an example virtual circular buffer, in accordance with certain aspects of the present disclosure.

FIG. 5 illustrates an example virtual circular buffer 500, in accordance with certain aspects of the present disclosure. As shown in FIG. 5, the virtual circle buffer 500 may illustrate example rate matching done at the transmitter, per CB, after the sub-block interleaver. As shown in FIG. 5, the entire virtual circle buffer 500 of size $K_w$ can be divided into for example three arcs of $K_\Pi$ such that $K_w = 3 \times K_\Pi$. The soft buffer size for the TB may be defined as $N_{IR}$ bits and the soft buffer size for the $r^{th}$ CB can be defined as $N_{cb}$. The soft buffer size for the CB is given by the following formula:

$$N_{cb} = \min\left(\left\lfloor \frac{N_{IR}}{C} \right\rfloor, K_w\right)$$

The number of soft bits per TB is based on the maximum number of soft bits across all TTI's $N_{soft}$ according to the following formula:

$$N_{IR} = \left\lfloor \frac{N_{soft}}{K_{MIMO} * \min(M_{DL\_HARQ}, 8)} \right\rfloor$$

where $K_{MIMO}=2$ for transmission modes 3 or 4, and 1 for other modes in Release 8 and $M_{DL\_HARQ}$ is the maximum number of DL HARQ processes. Although the value "8" is included in the equation above, such value is exemplary, and a different number value may be employed. E bits are transmitted from the circular buffer. The E bits may be less than $N_{cb}$ or larger than $N_{cb}$ (e.g., referred to as wrapping the circular buffer).

Accordingly, what is needed are techniques and apparatus for storing data output from the demodulator (e.g., for efficiently storing high numbers of LLRs and/or decoded bits).

Whereas modems may typically store LLRs on-chip, in order to reduce and/or minimize on-chip storage and therefore chip area, techniques and apparatus are provided herein for transferring and storing one or more LLRs and/or decoded bits off-chip in external memory using memory transfers (e.g., MCDMA transfers) to external (e.g., double data rate (DDR)) memory. For example, by reducing and/or minimizing the frequency and/or size of those transfers, on-chip buffering and/or power consumption may be reduced and/or minimized. Thereby, memory savings may be achieved without performance penalty such as to modem throughput and HW data path size required to achieve a peak rate.

According to certain aspects, on-chip memory storage of one or more LLRs and/or decoded bits may be reduced (e.g., storing only 340 KB on-chip as compared to storing 5.5 MB for a Category 4 UE with 3 bit LLRs across 8 HARQ interlaces) by using a local LLR buffer that is sized based on the pipeline depth of the CB, HARQ combining, deinterleaving, and/or decoding such that the smallest number of CBs are buffered on-chip and all other LLRs are stored off-chip without unduly impacting the modem hardware (HW), pipelining, and/or overall timeline efficiency.

In aspects, CB LLRs are stored only for CBs that fail CB CRC. This is referred to as "conditional HARQ offload" because CB LLRs are stored off-chip only on the condition that the CB fails CRC. By offloading (e.g., storing or writing to external memory) LLRs only from CBs that fail decoding, power savings are realized from memory transfer reduction and/or minimization. Many TBs will pass CRC on their first transmission with all CBs passing their CB CRCs. In those cases no LLRs are transferred and memory transfer is minimized, thereby saving power.

According to certain aspects, the LLR write range for a failing CB may be reduced and/or minimized based on the range of a current transmission's LLRs and/or the range of one or more previous transmissions' LLRs. For example, LLRs already stored for a CB (e.g., from a previous failing CB CRC) are only re-offloaded for the current transmission if there is a potential change in their value based on the current range. In aspects, for a given CB that fails its CB CRC, only LLRs from the subset of the CB circle on which new information was received on this transmission are offloaded, since other ranges have not yet been transmitted or were already stored for potential onload.

Figure 6:
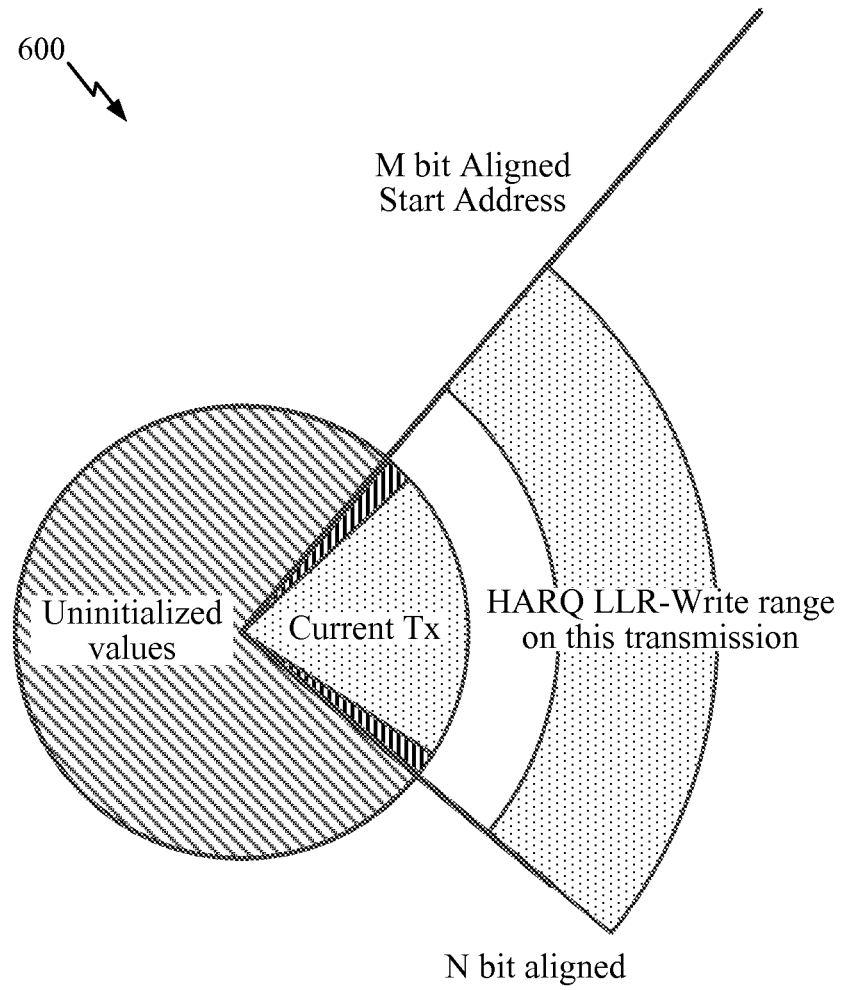
FIG. 6 illustrates an example log-likelihood ratio (LLR) write range for a failing first transmission, in accordance with certain aspects of the present disclosure.

FIG. 6 illustrates an example LLR write range to a virtual circular buffer 600 for a failing first transmission, in accordance with certain aspects of the present disclosure. As shown in FIG. 6, for a given CB, subsets of $N_{cb}$ may be offloaded according to which LLRs were affected by the latest transmission. For example, the LLRs from the demodulator output may be offloaded (e.g., read from the local memory and written to the external memory) if the CB failed its CB CRC. The other values may remain uninitialized.

Figure 7:
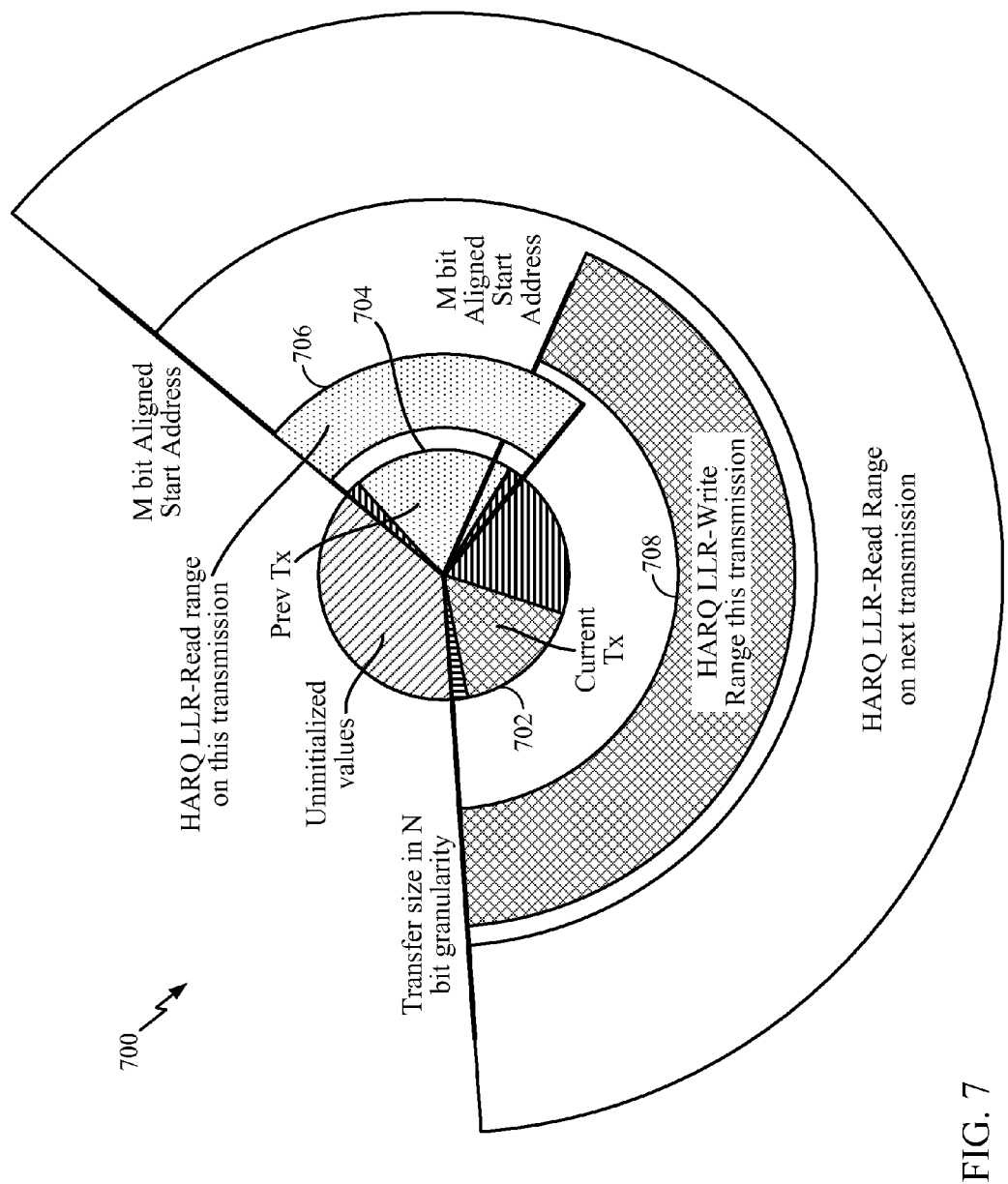
FIG. 7 illustrates an example LLR read/write range for a failing re-transmission, in accordance with certain aspects of the present disclosure.

FIG. 7 illustrates an exemplary LLR read/write ranges to/from a virtual circular buffer 700 for a failing re-transmission, in accordance with certain aspects of the present disclosure. As seen in FIG. 7, on a CB re-transmission (e.g., current transmission 702), LLRs 706 associated with a previous transmission 704 (e.g., the transmission of FIG. 6) of the CB may be onloaded (e.g., read from the external memory and written to the local memory). As shown in FIG. 7, the LLR range 708 of the current transmission 702 may have an M bit start address such that the LLR range 708 of the current transmission 702 overlaps with the LLR 706 of the previous transmission that have already been stored to the buffer and are available for onload. Thus, for the current transmission, only the non-overlapping LLRs may be offloaded (e.g., if the transmission failed its CB CRC) to the external memory. In the next transmission, the stored LLRs from both the current transmission 702 and the previous transmission 706 will be available for onload.

In aspects, onloaded LLRs may be HARQ combined and un-transmitted LLRs may be zeroed per the addressing requirements. The LLR range of the re-transmission may be based at least on the re-transmission. On the third transmission (e.g., a second re-transmission), the subset of $N_{cb}$ spanning the first and second transmissions may be read in (e.g., from the external memory). In this manner, the read range for a transmission may be based on one or more previous transmissions.

Figure 8:
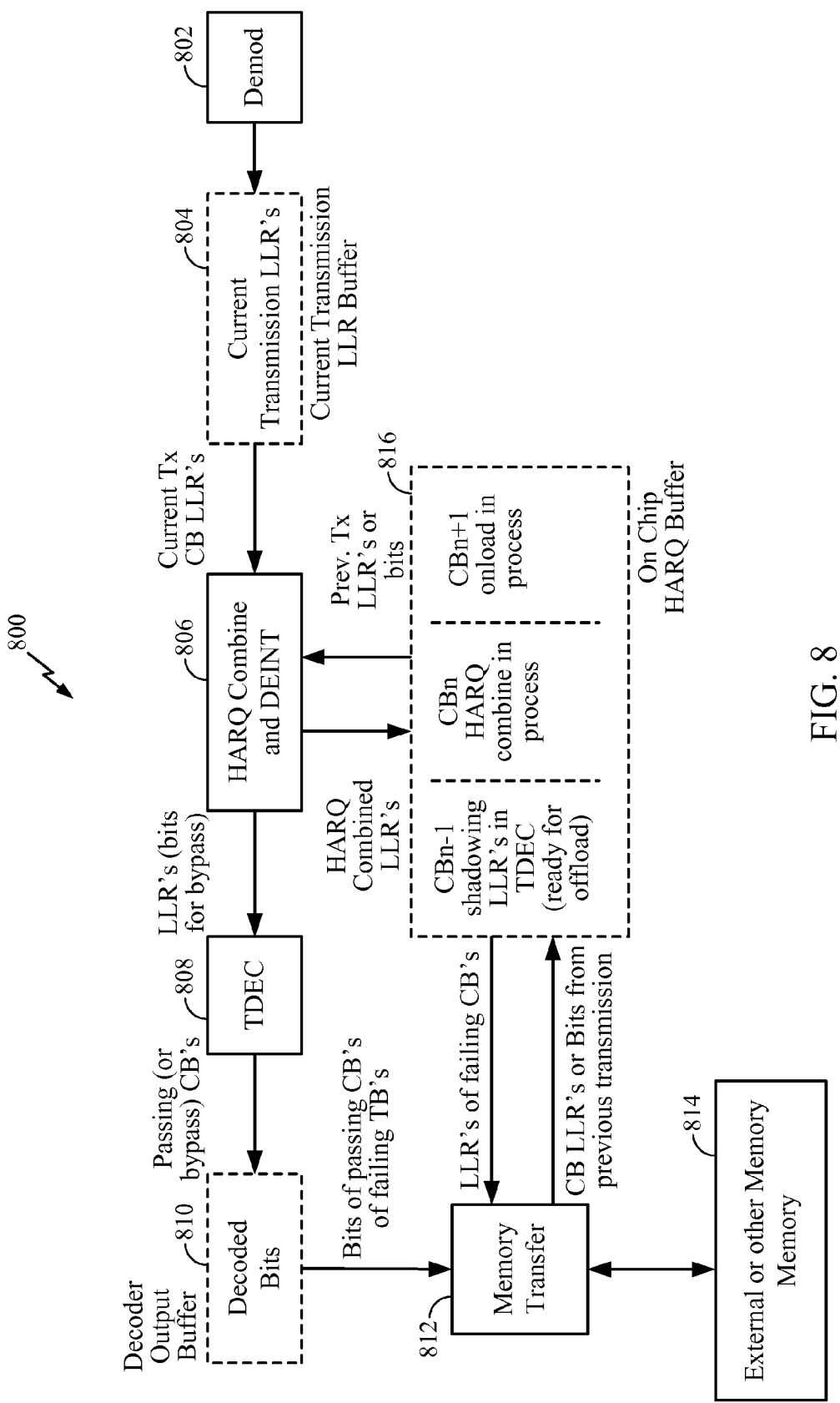
FIG. 8 illustrates an example code block (CB) hybrid automatic repeat request (HARQ) buffer and LLR/decoded bit memory transfer, in accordance with certain aspects of the present disclosure.

FIG. 8 is a block diagram 800 of an example CB HARQ buffer and LLR/decoded bit memory transfer, in accordance with certain aspects of the present disclosure. As shown in FIG. 8, LLRs from a current transmission may be sent from a demodulator 802 and stored in a current transmission LLR buffer 804. In aspects, the current transmission CB LRRs may be sent to a HARQ combiner and deinterleaver 806. LLRs for bypass can be sent to turbo decoder 808 (TDEC). Decoded bits of passing CBs (or bypass CBs) may be stored in the decoder output buffer 810 and then stored in the memory 814 (e.g., external memory or other memory) via memory transfer 812. From the HARQ combiner and deinterleaver 806, LLRs of failing CBs can be offloaded from the On Chip HARQ Buffer 816 via the memory transfer 812 to memory 814 (e.g., external memory or other memory). In aspects, LLRs and decoded bits can also be read in (onloaded) from the memory 814 to the On Chip HARQ Buffer 816 via memory transfer 812 for HARQ combining with a current transmission at the HARQ combiner and deinterleaver 806.

According to certain aspects, it is desirable to minimize the on chip memory (e.g., On Chip HARQ buffer 816) without impacting modem throughput or HW data path size to achieve a peak rate. As shown in the example illustrated in FIG. 8, to keep a pipeline of Onload→HARQ-DEINT→TDEC→Offload fully efficient on a failing retransmission where a CB has both LLR onloads and offloads may use a HARQ buffer size of 3 CBs (e.g., CBn−1, CBn, and CBn+1). In the example, LLRs in CBn+1 may be in the process of offload to the memory 814, CBn may be in the HARQ-DEINT block 806, and CBn−1 may be in the TDEC 808. Alternatively, in a different example, CBn+1 may be in the process of being onloaded, CBn may be in the HARQ-DEINT block 806, and CBn−1 may be in the TDEC block 808.

According to certain aspects, for a TB which has both passing and failing CBs, LLRs may be offloaded for the failing CBs and decoded bits may be offloaded for the passing CBs. On the retransmission of a previously passing CB of a failing TB, bits from prior passing CBs may be onloaded and appended to onloaded LLR bits from another prior failing CB. Onloaded LLRs may be HARQ-combined with the current transmission LLRs and decoding for the previously failing CB may be attempted. The TB may be formed with newly decoded CBs from the decoder output and onloaded bits from prior passing CBs.

In aspects, a TB CRC check may be performed on a current transmission to verify the accuracy of CB bits that were decoded on previous transmissions and CB bits decoded on the current transmission.

Figure 9:
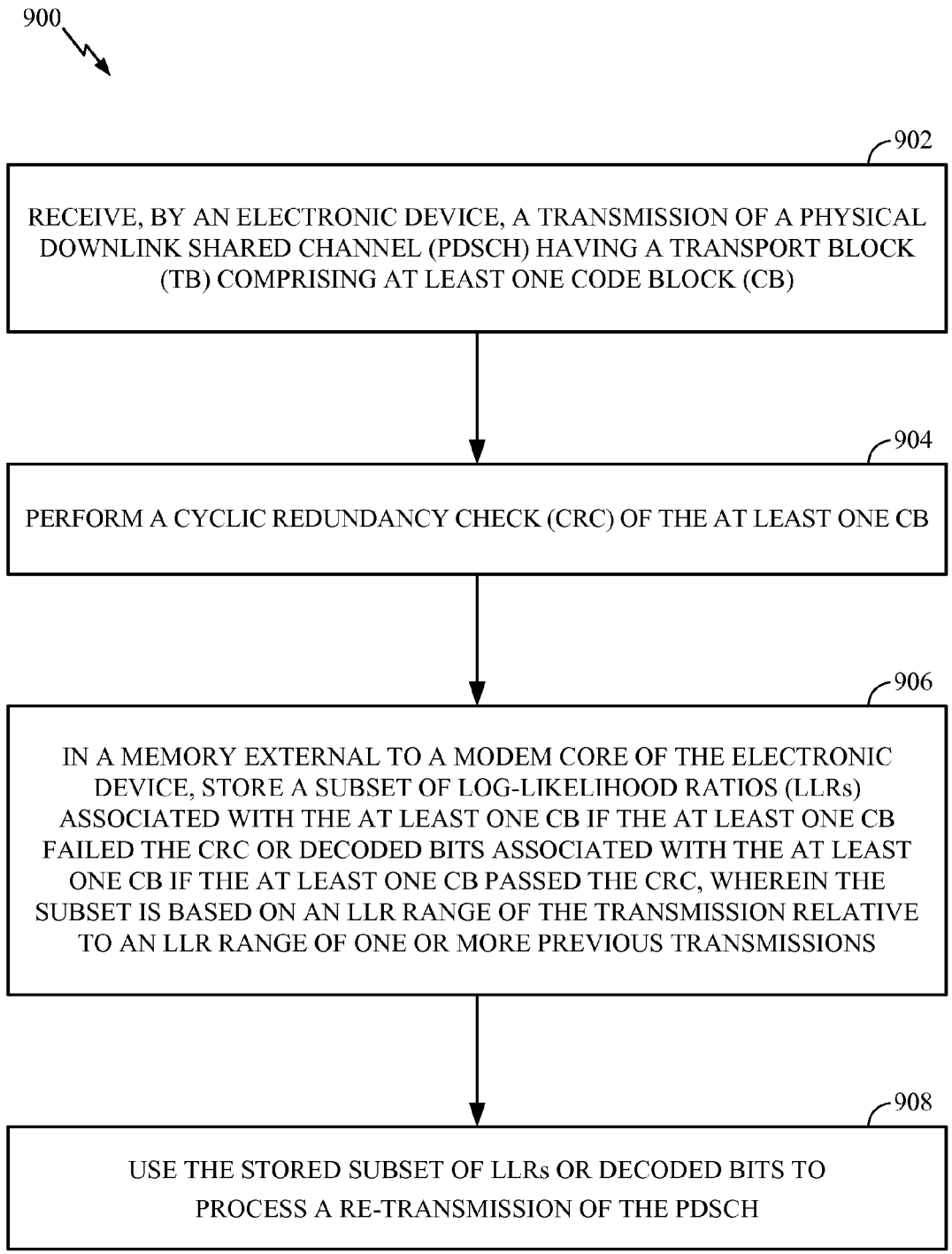
FIG. 9 illustrates example operations for wireless communications by an electronic device, in accordance with aspects of the present disclosure.

FIG. 9 illustrates example operations 900 for wireless communications, in accordance with aspects of the present disclosure. The operations 900 may be performed, for example, by an electronic device. The operations 900 may begin, at 902, by receiving a transmission of a physical downlink shared channel (PDSCH) having a transport block (TB) comprising at least one code block (CB). In aspects, the TB may comprise at least two CBs.

At 904, the electronic device may perform a cyclic redundancy check (CRC) of the at least one CB.

At 906, the electronic device, in a memory external to a modem core of the electronic device, may store a subset of log-likelihood ratios (LLRs) associated with the at least one CB if the at least one CB failed the CRC or decoded bits associated with the at least one CB if the at least one CB passed the CRC, wherein the subset is based on an LLR range of the transmission relative to an LLR range of one or more previous transmissions. For example, the subset may comprises LLRs outside the LLR range of the one or more previous transmissions. In aspects, the subset may be further based on a size of memory local to the modem core. In aspects, a range of a transmission may be based on a bandwidth associated with the transmission, and may be determined and/or known to the receiver or receive processor receiving the transmission.

According to certain aspects, the electronic device may store, in the memory, based at least in part on a LLR range of the re-transmission, LLRs associated with the re-transmission including the at least one CB if the at least one CB failed the CRC or decoded bits associated with the re-transmission including the at least one CB if the at least one CB passed the CRC. In aspects, the electronic device may, in the memory, store based on LLR ranges of previous transmissions, LLRs associated with a second re-transmission including the at least one CB if the at least one CB failed the CRC or decoded bits associated with the second re-transmission including the at least one CB if the at least one CB passed the CRC. In aspects, the LLRs or decoded bits may be stored in a memory local to the modem core prior to storing in the memory.

At 908, the electronic device may use the stored subset of LLRs or decoded bits to process a re-transmission of the PDSCH. In aspects, the electronic device may read the stored LLRs or decoded bits from the memory. In aspects, the electronic device may form TB bits based on CB bits that were decoded and stored in the memory on a previous transmission and CB bits that were decoded successfully for the first time on the re-transmission. In aspects, the electronic device may perform a CRC on a TB of the re-transmission to verify correctness of CB bits that were decoded on the previous transmissions and CB bits that were decoded on the re-transmission.

According to certain aspects, the electronic device may perform a CRC of the TB. In aspects, the electronic device may store LLRs for all CBs of the TB only if the CRC of the TB fails.

As used herein, a phrase referring to "at least one of" a list of items refers to any combination of those items, including single members. As an example, "at least one of: a, b, or c" is intended to cover: a, b, c, a-b, a-c, b-c, and a-b-c.

Those of skill in the art would understand that information and signals may be represented using any of a variety of different technologies and techniques. For example, data, instructions, commands, information, signals, bits, symbols and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, circuits and algorithm steps described in connection with the disclosure herein may be implemented as electronic hardware, computer software, or combinations of both. To clearly illustrate this interchangeability of hardware and software, various illustrative components, blocks, modules, circuits and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the disclosure herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components or any combination thereof designed to perform the functions described herein. A general-purpose processor may be a microprocessor, but in the alternative, the processor may be any conventional processor, controller, microcontroller or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the disclosure herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM or any other form of storage medium known in the art. An exemplary storage medium is coupled to the processor such that the processor can read information from, and/or write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal Generally, where there are operations illustrated in Figures, those operations may have corresponding counterpart means-plus-function components with similar numbering.

In one or more exemplary designs, the functions described may be implemented in hardware, software, firmware or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein, but is to be accorded the widest scope consistent with the principles and novel features disclosed herein.

What is claimed is:

1. A method of wireless communications by an electronic device, comprising:
   receiving a transmission of a physical downlink shared channel (PDSCH) having a transport block (TB) comprising at least one code block (CB);
   performing a cyclic redundancy check (CRC) of the at least one CB;
   in a memory external to a modem core of the electronic device, storing a subset of log-likelihood ratios (LLRs) associated with the at least one CB if the at least one CB failed the CRC or decoded bits associated with the at least one CB if the at least one CB passed the CRC, wherein the subset is based on an LLR range of the transmission relative to an LLR range of one or more previous transmissions; and
   using the stored subset of LLRs or decoded bits to process a re-transmission of the PDSCH.

2. The method of claim 1, further comprising:
   performing a CRC of the TB.

3. The method of claim 2, further comprising:
   storing LLRs for all CBs of the TB only if the CRC of the TB fails.

4. The method of claim 1, wherein the TB comprises at least two CBs.

5. The method of claim 1, wherein the subset comprises LLRs outside the LLR range of the one or more previous transmissions.

6. The method of claim 1, wherein the subset is further based on a size of memory local to the modem core.

7. The method of claim 1, wherein the TB comprises at least two CBs, and further comprising:
   forming TB bits based on CB bits that were decoded and stored in the memory on a previous transmission and CB bits that were decoded successfully on the re-transmission.

8. The method of claim 7, further comprising:
   performing a CRC on a TB of the re-transmission to verify correctness of CB bits that were decoded on the previous transmission and CB bits that were decoded on the re-transmission.

9. The method of claim 1, further comprising:
   in the memory, storing based at least in part on an LLR range of the re-transmission, LLRs associated with the re-transmission including the at least one CB if the at least one CB failed the CRC or decoded bits associated with the re-transmission including the at least one CB if the at least one CB passed the CRC.

10. The method of claim 9, further comprising:
    in the memory, storing based on LLR ranges of previous transmissions, LLRs associated with a second re-transmission including the at least one CB if the at least one CB failed the CRC or decoded bits associated with the second re-transmission including the at least one CB if the at least one CB passed the CRC.

11. The method of claim 1, wherein the LLRs or decoded bits are stored in a memory local to the modem core prior to storing in the memory.

12. The method of claim 1, wherein using the stored subset of LLRs or decoded bits to process a re-transmission includes reading the stored LLRs or decoded bits from the memory.

13. An apparatus for wireless communications by an electronic device, comprising:
    means for receiving a transmission of a physical downlink shared channel (PDSCH) having a transport block (TB) comprising at least one code block (CB);
    means for performing a cyclic redundancy check (CRC) of the at least one CB;
    means for, in a memory external to a modem core of the electronic device, storing a subset of log-likelihood ratios (LLRs) associated with the at least one CB if the at least one CB failed the CRC or decoded bits associated with the at least one CB if the at least one CB passed the CRC, wherein the subset is based on an LLR range of the transmission relative to an LLR range of one or more previous transmissions; and
    means for using the stored subset of LLRs or decoded bits to process a re-transmission of the PDSCH.

14. The apparatus of claim 13, further comprising:
    means for performing a CRC of the TB.

15. The apparatus of claim 14, further comprising:
    means for storing LLRs for all CBs of the TB only if the CRC of the TB fails.

16. The apparatus of claim 13, wherein the TB comprises at least two CBs.

17. The apparatus of claim 13, wherein the subset comprises LLRs outside the LLR range of the one or more previous transmissions.

18. The apparatus of claim 13, wherein the subset is further based on a size of memory local to the modem core.

19. The apparatus of claim 13, wherein the TB comprises at least two CBs, and further comprising:
    means for forming TB bits based on CB bits that were decoded and stored in the memory on a previous transmission and CB bits that were decoded successfully on the re-transmission.

20. The apparatus of claim 19, further comprising:
    means for performing a CRC on a TB of the re-transmission to verify correctness of CB bits that were decoded on the previous transmission and CB bits that were decoded on the re-transmission.

21. The apparatus of claim 13, further comprising:
    means for, in the memory, storing based at least in part on an LLR range of the re-transmission, LLRs associated with the re-transmission including the at least one CB if the at least one CB failed the CRC or decoded bits associated with the re-transmission including the at least one CB if the at least one CB passed the CRC.

22. The apparatus of claim 21, further comprising:
    means for, in the memory, storing based on LLR ranges of previous transmissions, LLRs associated with a second re-transmission including the at least one CB if the at least one CB failed the CRC or decoded bits associated with the second re-transmission including the at least one CB if the at least one CB passed the CRC.

23. The apparatus of claim 13, wherein the LLRs or decoded bits are stored in a memory local to the modem core prior to storing in the memory.

24. The apparatus of claim 13, wherein using the stored subset of LLRs or decoded bits to process a re-transmission includes reading the stored LLRs or decoded bits from the memory.

25. An apparatus for wireless communications by an electronic device, comprising:
- at least one processor configured to:
  - receive a transmission of a physical downlink shared channel (PDSCH) having a transport block (TB) comprising at least one code block (CB);
  - perform a cyclic redundancy check (CRC) of the at least one CB;
  - in a memory external to a modem core of the electronic device, store a subset of log-likelihood ratios (LLRs) associated with the at least one CB if the at least one CB failed the CRC or decoded bits associated with the at least one CB if the at least one CB passed the CRC, wherein the subset is based on an LLR range of the transmission relative to an LLR range of one or more previous transmissions; and
  - use the stored subset of LLRs or decoded bits to process a re-transmission of the PDSCH; and
- a memory coupled with the at least one processor.

26. The apparatus of claim 25, further comprising:
means for, in the memory, storing based at least in part on a LLR range of the re-transmission, LLRs associated with the re-transmission including the at least one CB if the at least one CB failed the CRC or decoded bits associated with the re-transmission including the at least one CB if the at least one CB passed the CRC.

27. The apparatus of claim 26, further comprising:
means for, in the memory, storing based on LLR ranges of previous transmissions, LLRs associated with a second re-transmission including the at least one CB if the at least one CB failed the CRC or decoded bits associated with the second re-transmission including the at least one CB if the at least one CB passed the CRC.

28. A non-transitory computer-readable medium having instructions stored thereon, the instructions executable by an apparatus for:
- receiving a transmission of a physical downlink shared channel (PDSCH) having a transport block (TB) comprising at least one code block (CB);
- performing a cyclic redundancy check (CRC) of the at least one CB;
- in a memory external to a modem core of the electronic device, storing a subset of log-likelihood ratios (LLRs) associated with the at least one CB if the at least one CB failed the CRC or decoded bits associated with the at least one CB if the at least one CB passed the CRC, wherein the subset is based on an LLR range of the transmission relative to an LLR range of one or more previous transmissions; and
- using the stored subset of LLRs or decoded bits to process a re-transmission of the PDSCH.

29. The computer-readable medium of claim 28, the instructions further executable by an apparatus for:
in the memory, storing based at least in part on a LLR range of the re-transmission, LLRs associated with the re-transmission including the at least one CB if the at least one CB failed the CRC or decoded bits associated with the re-transmission including the at least one CB if the at least one CB passed the CRC.

30. The computer-readable medium of claim 29, the instructions further executable by an apparatus for:
in the memory, storing based on LLR ranges of previous transmissions, LLRs associated with a second re-transmission including the at least one CB if the at least one CB failed the CRC or decoded bits associated with the second re-transmission including the at least one CB if the at least one CB passed the CRC.

* * * * *